United States Patent [19]

Yurcheshen et al.

[11] 3,965,058

[45] June 22, 1976

[54] COREACTION PRODUCTS

[75] Inventors: Michael Yurcheshen, Parma Heights; Morris Levine, Cleveland Heights; Ralph M. Brane, Bay Village, all of Ohio

[73] Assignee: PPG Industries, Inc., Pittsburgh, Pa.

[22] Filed: Aug. 29, 1969

[21] Appl. No.: 854,262

Related U.S. Application Data

[62] Division of Ser. No. 444,793, April 1, 1965, Pat. No. 3,502,557.

[52] U.S. Cl. ............ 260/21; 204/181; 260/22 CQ; 260/29.2 N; 260/29.2 E; 260/29.4 R; 260/67.6 R; 260/67.7; 60/70 M; 260/240 R; 260/249.6; 260/249.9; 260/850; 428/458; 428/460

[51] Int. Cl.²...................... C09D 3/50; C09D 3/52; C09D 5/40

[58] Field of Search.................. 260/67.6, 70 M, 21, 260/22 R, 850, 29.2 N, 249.6; 204/181; 428/458, 460.

[56] References Cited

UNITED STATES PATENTS

| | | | |
|---|---|---|---|
| 2,524,111 | 10/1950 | La Piana et al. | 260/70 |
| 2,680,734 | 6/1954 | Dearing | 260/70 |
| 3,052,570 | 9/1962 | Polansky et al. | 260/67.6 |
| 3,056,755 | 10/1962 | Culbertson et al. | 260/67.6 |

*Primary Examiner*—Ronald W. Griffin
*Attorney, Agent, or Firm*—George D. Morris; Carl T. Severini

[57] ABSTRACT

Ungelled thermosetting products are produced by reacting an amine-aldehyde condensate, such as malamine-formaldehyde or urea-formaldehyde resin, with a polyfunctional material containing both hydroxyl and carboxyl groups. Preferred polyfunctional materials include di(hydroxyaryl) alkylidene carboxylic acids. Water-dispersed compositions in which the vehicle comprises such reaction products alone or in combination with other resins are applied by electrodeposition.

44 Claims, No Drawings

COREACTION PRODUCTS

This application is a division of copending application Ser. No. 444,793, filed Apr. 1, 1965, now U.S. Pat. No. 3,502,557.

This invention relates to modified amine-aldehyde condensation products suitable for use in electrodeposition processes and for other purposes, and to electrodeposition of coating compositions containing such modified products.

Electrodeposition, although known for some time, has only recently become of commercial importance as a coating application method. The increased use of such methods has been due to the development of certain compositions which provide highly satisfactory coatings when applied in this manner. While many compositions can be electrodeposited, most coating compositions when applied using electrodeposition techniques do not produce commercially usable coatings. Moreover, electrodeposition of many coating materials, even when otherwise successful, is often attended by various disadvantages such as non-uniform coatings and by poor throwing power. By "throwing power" is meant that property whereby areas of the electrode being coated at varying distances from the other electrode receive substantially the same density of the product.

As indicated above, various coating compositions can be applied by electrodeposition techniques. The coatings achieved, however, have in most instances been deficient in certain properties essential for their utilization in many applications for which electrodeposition is otherwise suited. For example, properties such as corrosion resistance, hardness, alkali resistance, and similar characteristics necessary for coatings are difficult to achieve, especially with waterdispersed resins such as are employed in electrodeposition processes.

It has now been found that certain reaction products of an amine-aldehyde condensate and a polyfunctional hydroxyl-containing carboxylic acid provide highly advantageous results and coatings that can be successfully applied by electrodeposition. These coreaction products can be themselves the prime or sole film-forming constituent of coating compositions or, as is more usually the case, they can be included in such a composition along with another coating material. When employed with another film-forming component, these products impart highly desirable properties, including those ordinarily associated with the inclusion of amine-aldehyde resins in coatings, and, in addition, provide unique advantages and properties to the coated products.

The coreaction products of the invention are ungelled, thermosetting products made by reacting an aminealdehyde condensation product with a polyfunctional material containing both hydroxyl groups and carboxyl groups. While it is clear that a reaction takes place to combine the polyfunctional material and the amine-aldehyde condensate, the exact nature of the reaction and the structure of the product appear to be complex and are not known with certainty.

The amine-aldehyde product employed can be any of the aldehyde condensation products of melamine, urea, benzoguanamine, or similar compounds; these may be water soluble or organic-solvent soluble. Condensation products of melamine or urea are the most common and are preferred, but such products of other amines and amides in which at least one amino group is present can also be employed. For example, such condensation products can be produced from triazines, diazines, triazoles, guanadines and guanamines, and alkyl-substituted, aryl-substituted, and other derivatives of such compounds, such as alkyl-substituted, aryl-substituted, and cyclic ureas and alkyl-substituted and aryl-substituted melamines.

Some specific examples of such compounds are N,N'-dimethyl urea, benzyl urea, dicyanadiamide, formoguanamine, acetoguanamine, ammeline, N,N'-ethylene urea, diazine diamide, 2-chloro-4,6-diamino-1,3,5-triazine, 2-phenyl-4-amino-6-hydroxy-1,3,5-triazine, 3,5-diaminotriazole, triaminopyrimidine, 2-mercapto-4,6-diaminopyrimidine, 2,4,6-trihydrazine-1,3,5-triazine, 2,4,6-triethyltriamino-1,3,5-triazine, 2,4,6-triphenyltriamino-1,3,5-triazine, and the like. For certain purposes, reaction products of condensates of urea are less desirable than, for example, those of melamine; this is true, for instance, where the coating is required to have resistance to alkaline atmospheres. However, while urea derivatives have relatively poor alkali resistance, they are in many cases superior in salt-spray resistance.

The aldehyde employed in making these condensates is most often formaldehyde, although similar condensation products can be made from other aldehydes such as acetaldehyde, crotonaldehyde, acrolein, benzaldehyde, furfural, and others.

These aldehyde condensation products contain methylol or similar alkylol groups, the structure of the alkylol group depending upon the particular aldehyde employed. All or part of these alkylol groups may be etherified by reaction with an alcohol, if desired. Among the preferred amine-aldehyde products for use in the present invention are those which are substantially alkylated by an etherification reaction, i.e., in which at least a major portion of the alkylol groups have been reacted with an alcohol. Essentially any monohydric alcohol can be employed for this purpose, including such alcohols as methanol, propanol, butanol, heptanol and other alkanols having up to about 12 carbon atoms or more, as well as benzyl alcohol and other aromatic alcohols, cyclic alcohols such as cyclohexanol, monoethers of glycols such as the Cellosolves and Carbitols, and halogen-substituted or other substituted alcohols, such as 3-chloro-propanol. The preferred alcohols are methanol, butanol, and similar lower alkanols.

The amine-aldehyde condensation products are produced in the art, using acidic or basic catalysts and varying conditions of time and temperature. The aldehyde is often employed as a solution in water or alcohol, and the condensation, polymerization and etherification reactions may be carried out either sequentially or simultaneously.

The polyfunctional compound reacted with the amine-aldehyde condensate can be any carboxylic acid which contains one or more alcoholic or phenolic hydroxyl groups (the —OH which is part of the carboxyl group is not considered a hydroxyl group in this definition).

Various hydroxy acids can be employed, including such compounds as glycolic acid, beta-hydroxy propionic acid, alpha-hydroxy butyric acid, dimethylol propionic acid, mandelic acid, 2-hydroxy-3-methylbenzoic acid, 2,4,6-trihydroxybenzoic acid, and other aliphatic and aromatic hydroxyl-containing carboxylic acids. When an aliphatic acid is employed, it is preferred to have a relatively long-chain material, such as ricinoleic acid or other hydroxyl-containing acids having carbon chains similar to the fatty acids.

Especially desirable for certain applications are carboxylic acids containing phenolic groups. These have been found to impart a relatively high degree of alkali resistance and other desirable properties to the coatings. The di(hydroxyaryl)-alkylidene carboxylic acids are among those which are highly desirable. These include compounds of the formula:

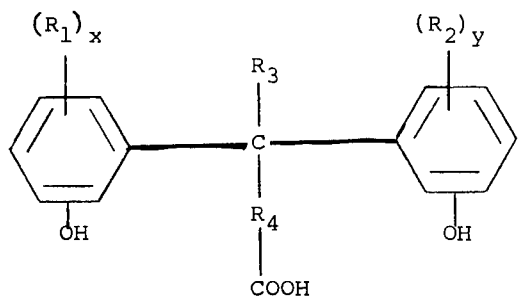

where $R_1$, $R_2$ and $R_3$ are hydrogen or alkyl and $R_4$ is alkylene, and $x$ and $y$ are each 0, 1 or 2. 4,4-bis(4-hydroxyphenyl)-pentanoic acid is the compound of this class which is most often utilized.

The amine-aldehyde condensate and the polyfunctional acid are reacted to produce the coreaction product of the invention. The conditions of the reaction are not critical; in most instances, heating to temperatures between about 125°F. and 400°F. is employed. A solvent may be included initially, but usually solvent is not added until after the reaction. Various solvents can be used, including alcohols, hydrocarbons, etc.; if the product is to be dispersed in water, a watersoluble solvent is preferred. Water or alcohol is evolved during the reaction and this may be removed if desired, or allowed to remain in the reaction mixture.

The proportion of the amine-aldehyde condensate in the reaction product can be varied widely. Based on the total of the condensate and the hydroxy acid, the condensate can comprise from about 20 percent to about 80 percent by weight of the product, with about 40 percent to about 60 percent being preferred.

In addition to the amine-aldehyde condensate and the hydroxyl-containing carboxylic acid, the reaction product can include other components; most often employed is a polyol or an epoxy resin. Diols are preferred, as are epoxides such as reaction products of epichlorohydrin and Bisphenol A. These can be added to the reaction mixture initially or at any stage in the process.

The coreaction products thus produced can be employed as the film-forming component in coating compositions along with pigments, fillers, additives, solvents and the like, and these can be applied by electrodeposition or by other means. It is usually preferred, however, to employ these reaction products in conjunction with another film-forming material.

Essentially any film-forming material can be combined with the coreaction product, with the chief consideration being compatibility in the desired proportions. When the composition is to be electrodeposited, any electrodepositable material can be employed; the addition of the coreaction products described herein improves the properties of any such material. Polycarboxylic acid resins are most often employed in electrodeposition processes and the reaction products herein are especially suited to inclusion in compositions comprising such polycarboxylic acid resins. A particular advantage of these reaction products in such compositions is that the reaction product is codeposited along with the polycarboxylic acid resin to a much higher degree than is the case with the amine aldehyde condensates themselves.

The polycarboxylic acid resins include those materials which contain a plurality of carboxyl groups within the resin molecular. These include, for example, copolymers of an acrylic acid with one or more acrylate or methacrylates, and more preferably, alkyd resins and reaction products of fatty acid esters with unsaturated dicarboxylic acids or anhydrides, e.g., the so-called "maleinized oils", which are reaction products of a siccative oil and maleic anhydride.

The alkyd resins employed in such compositions can be any of the saturated or unsaturated alkyds utilized in the coatings field, produced from any polybasic acid and polyfunctional alcohol. For example, the alkyd may be made from such polyfunctional acids as phthalic acid, maleic acid, fumaric acid, isophthalic acid, succinic acid, adipic acid, azoleic acid, fatty acids and the like, as well as anhydrides of such acids. Among the polyols employed are glycerol, trimethylolethane, trimethylolpropane, pentaerythritol, sorbitol, mannitol, ethylene glycol, diethylene glycol, 2,3-butylene glycol, and similar alcohols. The alkyd resin may be oil-modified or non oil-modified, can contain in part a monobasic acid such as benzoic acid, and can be copolymerized with one or more other ethylenically unsaturated monomers. Such monomers include ethyl acrylate, methyl methacrylate and other esters of acrylic acid and methacrylic acid, acrylonitrile, olefinic hydrocarbons, and other polymerizable monomers, preferably containing a $CH_2=C<$ group.

For use in electrodeposition, water-dispersible alkyds are preferred, such as those in which a glycerol phthalate resin or other conventional alkyd, which may be modified with drying oil fatty acids, is made with a high acid number, or those in which a surface active agent such as a polyalkylene glycol (e.g., "Carbowax") is incorporated. High acid number alkyds are also made by employing a tricarboxylic acid such as trimellitic acid or anhydride.

Another type of coating composition in which these coreaction products provide beneficial results are those in which the vehicle comprises a reaction product of a drying oil fatty acid ester with an alpha, beta-ethylenically unsaturated dicarboxylic acid or an anhydride of such an acid. The composition may also comprise the reaction product of the ester, acid or anhydride and one or more other ethylenically unsaturated monomers. Part of the carboxylic groups from the acid or anhydride can be esterified by reaction with an alcohol if so desired.

The fatty acid esters used to make the aforesaid vehicles are esters of fatty acids which are or can be derived from drying oils or from such sources as tall oil. (By "drying oil" is meant those oils having an iodine number of greater than about 90, thus including so-called "semi-drying oils".) Examples of such esters include linseed oil, safflower oil, perilla oil, tung oil, oiticica oil, sunflower oil, tall oil esters, dehydrated castor oil, fish oils, and the like.

The fatty acid ester may also be an alkyd resin prepared utilizing a semi-drying or drying oil; an ester of an epoxide with such fatty acids; or a semi-drying or drying oil fatty acid ester of a monomeric or resinous polyol. If desired, the ester may be modified with other acids, such as saturated, unsaturated or aromatic acids, as well as with such acid materials as rosin.

The alpha, beta-ethylenically unsaturated dicarboxylic acid or anhydride may be an anhydride such as maleic anhydride or itaconic anhydride, or an unsaturated dicarboxylic acid which forms an anhydride, for example, maleic acid or itaconic acid. The acids appear to function by first forming an anhydride. Fumaric acid, which does not form an anhydride, may also be employed, as can mixtures of any of the above acids or anhydrides. Usually the anhydride or acid employed contains from 4 to 12 carbon atoms. The reaction between the acid or anhydride and the fatty acid ester takes place readily without the use of a catalyst at temperatures between about 100°C. and about 300°C., depending primarily upon the type of fatty acid ester used.

As indicated, the ester-acid or anhydride product can also include one or more other ethylenically unsaturated monomers in polymerized form. Essentially, any ethylenically unsaturated monomer, e.g., those containing $CH_2=C<$ groups, can be employed for this purpose, with the preferred compounds being styrene, substituted styrenes, alkyl acrylates, alkyl methacrylates, diolefins and acrylonitrile. Although the proportions of the components in the foregoing fatty acid ester-acid or anhydride reaction products are not critical, it is preferred to utilize between about 10 percent and about 45 percent by weight of the unsaturated acid or acid anhydride with about 44 percent to about 90 percent by weight of fatty acid ester. If an ethylenically unsaturated monomer is incorporated in the reaction product, it is typically used in amounts between about 5 percent and about 35 percent by weight based upon the total weight of acid or anhydride and ester.

The proportions of coreaction product in the composition when a blend of materials is used can be widely varied. Essentially, any appreciable amount of coreaction product in conjunction with the other materials improves the properties thereof.

As little as 5 percent by weight or even less has an appreciable effect. Since the coreaction product can be utilized alone, there is no upper limit on the amount that can be included in a mixture, although compatibility should be considered. It is not always necessary that the components be completely compatible, but it is desirable that the mixture be reasonably stable on standing. In most instances in which a blend is utilized in an electrodeposition process, the amount of coreaction product is between about 10 percent and about 80 percent by weight of the total film-forming components.

When the products herein, either alone or blended with another material, are to be employed for electrodeposition, they are made water-dispersible by neutralizing all or part of the carboxyl groups by reaction with a base. The neutralization reaction is accomplished by mixing the neutralizing base with the carboxyl-containing components, usually in the presence of water. If desired, moderately elevated temperatures can be used. The extent of neutralization can be varied, and in practice is generally based upon the pH of the resulting dispersed composition. It is usually preferable that the pH be under about 10, but this depends upon the particular components. In most instances, the pH is at least about 7.5.

Inorganic bases, such as metal hydroxides or, more desirably, ammonia, can be used for the neutralization, as can organic bases, particularly amines. Among the preferred class of neutralizing bases are ammonia and any basic amine, including alkyl amines, cycloalkyl amines, unsaturated amines, aromatic amines, aryl amines, aralkyl amines, cyclic amines, diamines and substituted amines, of the primary, secondary, tertiary or quaternary amine types.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom, with the other two valences being linked to hydrogen or carbon atoms in the same or different organic radicals. Amido groups are formed, for example, when the reaction with the neutralizing base is carried out with a water solution of ammonia, a primary amine or a secondary amine or when the product is reacted with such an amine in the absence of water.

The electrodepositable coating compositions comprising the above reaction products contain in most instances a pigment composition and, if desired, various additives such as anti-oxidants, surface active agents and the like. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow and the like. Better results with pigmented compositions are attained if the weight ratio of pigment solids to vehicle solids is not higher than about 1.5 to 1, and preferably not higher than about 1 to 1. The coating compositions when employed for electrodeposition usually are made up of at least about 80 percent water.

In formulating the coating composition, ordinary tap water may usually be employed, but if such water contains a relatively high level of cations, it is desirable to employ distilled water or deionized water from which free ions have been removed, as by passage through an ion exchange resin.

The compositions including the coreaction products as described herein can be applied in any conventional manner, for example, by brushing, spraying, or roll coating. However, because these compositions are especially adapted for use in electrodeposition, and because coatings of the excellent characteristics attained by those herein are difficult to achieve by electrodeposition, emphasis is placed upon the utility of these materials in such processes.

In electrodeposition processes employing the various coating compositions described above, an aqueous bath containing the coating composition is placed in contact with an electrically conductive anode and an electrically conductive cathode, or in contact with another solution containing the cathode. The surface to be coated is employed as one of the electrodes. In the specific types of compositions described above, the surface to be coated is employed as the anode. Upon the passage of electric current between the anode and the cathode, while the anode is in contact with the bath containing the coating composition, an adherent film of the coating composition is deposited. The conditions under which the electrodeposition step herein is carried out are those conventionally used in electrodeposition of coatings. The applied voltage may be varied greatly and can be, for example, as low as 1 volt or as high as several thousand volts, although typically between 50 volts and 500 volts. The current density is usually between about 0.1 ampere and about 15 amperes per square foot, and tends to decrease during the electrodeposition.

The concentration of the non-volatile components (i.e., vehicle and any pigments and the like) in the aqueous bath is not critical and relatively high levels can be employed. However, it is ordinarily desirable to use as low a concentration as gives satisfactory results, and in the cases of the above-described compositions, aqueous compositions containing as little as 1 percent by weight of non-volatile solids can be employed, with those containing between about 5 percent and about 40 percent by weight being preferred.

Any conductive surface can be coated by the electrodeposition method described. Electrically conductive material surfaces such as iron, steel, aluminum, zinc and the like are most often utilized, but other conductive surfaces such as those in which a conductive material or coating is superimposed upon a non-conductive substrate can also be coated in this manner.

After deposition of the coating upon the surface, the coating is cured, generally by heating to elevated temperatures, with the temperature and time of heating being corelated to provide the desired degree of curing. For ordinary purposes, curing schedules of from 250° to 500°F. for 1 to 30 minutes are employed.

Set forth below are several specific examples of the invention. These examples, being illustrative, are not to be construed as limiting. All parts and percentages are by weight unless otherwise specified.

EXAMPLE 1

A mixture of 2400 parts of methylated hexamethylolmelamine having about 5.6 methoxy groups per mole of melamine and 1600 parts of 4,4-bis(4-hydroxyphenyl)pentanoic acid was heated slowly with agitation to 200°F. After 12 hours at this temperature, there were added 444 parts of 4-methoxy-4-methylpentanone-2. The products had a total solids content of 90 percent, a Gardner-Holdt viscosity of Z6 and an acid number of 65.

EXAMPLE 2

There were mixed 1000 parts of hexakis(methoxymethyl)-melamine and 400 parts of ricinoleic acid. The mixture was heated with stirring to 290°F. and maintained at this temperature for 8 hours, at which time it had an acid number of about 1. The reaction mixture was cooled, and there were added 600 parts of bis(4-hydroxyphenyl)-2,2-propane and 8 parts of paratoluene sulfonic acid. This mixture was heated at 200°F. for 3 hours, and then there were added 500 parts of 4-methoxy-4-methylpentanone-2. The product had a solids content of 80 percent, Gardner-Holdt viscosity of Y-Z, and an acid number of 24.

EXAMPLE 3

Following the procedure of Example 1, a reaction product was produced from 90 parts of hexakis(methoxymethyl)-melamine and 10 parts of 4,4-bis(4-hydroxyphenyl)pentanoic acid. Sufficient 4-methoxy-4-methylpentanone-2 was added to make the total solids content 80 percent. The product had a Gardner-Holdt viscosity of E and an acid number of 22.

EXAMPLES 4–10

The procedure of the foregoing examples was employed to produce reaction products from various components. In each case, after the reaction, 4-methoxy-4-methylpentanone-2 was added in an amount sufficient to give the solids content desired. The data are given in Table I.

TABLE I

| | EXAMPLES 4 – 10 | | | | | | |
|---|---|---|---|---|---|---|---|
| Example | 4 | 5 | 6 | 7 | 8 | 9 | 10 |
| Reactants (parts by weight) | | | | | | | |
| Hexakis(methoxymethyl)melamine | 60 | 60 | | 60 | 60 | 60 | |
| Butylated Urea — formaldehyde Resin C* | | | 60 | | | | |
| Butylated Urea — formaldehyde Resin D** | | | | | | | 60 |
| Ricinoleic acid | | | | | | 25 | 40 | 40 |
| 4,4-Bis(4-hydroxyphenyl)pentanoic acid | 20 | 20 | 40 | 20 | 15 | | |
| 2,2-Bis(4-hydroxycyclohexyl)propane | | 20 | | | | | |
| 2,2-Bis(4-hydroxyphenyl)propane | 20 | | | | | | |
| Polyepoxide*** | | | | | 20 | | |
| Product | | | | | | | |
| Total solids, per cent | 80 | 80 | 67 | 70 | 80 | 80 | 71 |
| Viscosity (Gardner-Holdt) | X+ | X | $Z_6$+ | T | $Z_1$ | T | V |
| Acid Number | 30 | 30 | 60 | 20 | 40 | 44 | 41 |

*Made from one mole of urea, 2.2 moles of formaldehyde and 1.6 moles of butanol; 50% solids in 1 to 1 butanol/xylene
**Made from one mole of urea, 2.75 moles of formaldehyde and 2.5 moles of butanol; 50% solids in 1 to 1 butanol/xylene
***Reaction product of epichlorohydrin and bisphenol A with an epoxide equivalent of 450 to 525

As indicated hereinabove, the reaction products produced in accordance with the foregoing examples can be utilized in various ways. For example, the reaction product can be used as the sole or primary film-forming component in coating compositions used to provide protective films and coatings. A hard, thermoset film is produced when a metal or other substrate is coated with these products and cured, a representative curing time being 30 minutes at 300°F. However, these products are ordinarily employed in conjunction with another film-forming material, and they are most desirable when employed in electrodepositable compositions wherein they are preferably blended with one or more polycarboxylic acid resins. The examples below illustrate this embodiment of the invention.

In the examples, several polycarboxylic acid resins are employed. That designated as Polycarboxylic Acid Resin A is an alkyd resin produced by heating a mixture of 1155 parts of 2,2-bis(4-hydroxycyclohexyl)propane, 896 parts of soybean fatty acid, and 504 parts of 1,5-pentanediol. During the heating there were added 896 parts of trimellitic anhydride, and this mixture was heated at 350°F. to 360°F. until it had an acid number of about 50. After cooling to 120°F., there were added 1071 parts of 4-methoxy-4-methylpentanone-2 and 19.4 parts of 1,2-propylene imine and the mixture was then heated to 170°F. for one-half hour. The product had a solids content of 75 percent.

Polycarboxylic Acid Resin B was made by heating a 4 to 1 weight mixture of linseed oil and maleic anhydride to 250°C. over a two hour period, and then holding the mixture at this temperature for 15 minutes.

EXAMPLES 11-23

Coating compositions were made by blending Polycarboxylic Acid Resin A or Polycarboxylic Acid Resin B with one of the reaction products of the above examples and then adding sufficient triethylamine and deionized water to give a dispersion with a total solids content of 40 percent and a pH of about 8. The compositions were pigmented by grinding iron oxide with the above vehicle at a pigment-to-vehicle solids ratio of 0.66 to 1. To this were added sufficient deionized water to give a composition having a total solids content of 8 percent and a pH of about 8.5.

Each composition thus produced was electrodeposited on both plain and phosphatized steel panels by employing the panel to be coated as the anode, with another similar panel as the cathode. Both electrodes were immersed in the coating composition, which was maintained at about 80°–85°F., and 120 to 140 volts were applied between the electrodes for 60 seconds. The panel in each case was then rinsed with water and baked for 45 minutes at 325°F. The various compositions employed in these Examples are shown in Table II.

TABLE II

EXAMPLES 11-23

| Example | Reaction Example | Product Parts | Polycarboxylic Resin | Acid Resin Parts |
|---|---|---|---|---|
| 11 | 1 | 100 | A | 168 |
| 12 | 1 | 100 | B | 126 |
| 13 | 2 | 100 | A | 107 |
| 14 | 2 | 100 | B | 80 |
| 15 | 3 | 100 | A | 268 |
| 16 | 4 | 100 | A | 150 |
| 17 | 4 | 100 | B | 112 |
| 18 | 5 | 100 | A | 150 |
| 19 | 6 | 100 | A | 125 |
| 20 | 7 | 100 | A | 131 |
| 21 | 8 | 100 | A | 150 |
| 22 | 9 | 100 | A | 150 |
| 23 | 10 | 100 | A | 133 |

In each of the above examples there was obtained a smooth, adherent film with a hardness sufficient to permit sanding, and other desirable properties. Except in the cases of Examples 19 and 23, the films had excellent alkali resistance, as shown by a test in which the film in each instance was scored and immersed for 6 days in 0.1 normal sodium hydroxide solution at 100°F. with no visible effects. The coatings obtained in Examples 19 and 23 were relatively poor in alkali resistance, but had better salt spray resistance than the other coatings; they withstood 96 hours in a salt spray cabinet, even when coated on plain steel.

Similar results were attained using various other reaction products and coating compositions. For example, other electrodepositable film-forming materials can be employed in conjunction with the reaction products, including polyesters, acrylic resins and the like; and reaction products made from other amine-aldehyde condensates can be used, such as tetrakis(methoxymethyl)benzoguanamine. Also, the coating composition used for electrodeposition can be made with other solubilizing agents, pigments, additives, etc. While specific properties obtained may vary in these cases, films desirable for many purposes are provided.

According to the provisions of the patent statutes, there are described above the invention and what are now considered to be its best embodiments. However, within the scope of the appended claims, it is to be understood that the invention can be practiced otherwise than as specifically described.

We claim:

1. An ungelled thermosetting reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a polyfunctional hydroxylcontaining carboxylic acid.

2. The reaction product of claim 1 in which said amine-aldehyde condensation product is a melamine-formaldehyde condensation product.

3. The reaction product of claim 1 in which said amine-aldehyde condensation product is substantially alkylated.

4. The reaction product of claim 1 in which said amine-aldehyde condensation product is substantially methylated hexamethylolmelamine.

5. An ungelled, thermosetting reaction product of an amine-aldehyde condensation product and a di(hydroxyaryl)alkylidene carboxylic acid.

6. The reaction product of claim 5 in which said acid is 4,4-bis(4-hydroxyphenyl)pentanoic acid.

7. An ungelled thermosetting reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a hydroxyl-substituted aliphatic carboxylic acid.

8. The reaction product of claim 7 in which said acid is ricinoleic acid.

9. A water-dispersed coating composition comprising an at least partially neutralized reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a polyfunctional hydroxyl-containing carboxylic acid.

10. A water-dispersed coating composition comprising an at least partially neutralized vehicle which comprises a. an ungelled, thermosetting reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a polyfunctional hydroxyl-containing carboxylic acid, and b. at least one other electrodepositable film-forming resin.

11. A water-dispersed coating composition comprising an at least partially neutralized vehicle which comprises
   a. an ungelled, thermosetting reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a polyfunctional hydroxyl-containing carboxylic acid, and
   b. a polycarboxylic acid resin.

12. The composition of claim 11 in which said polycarboxylic acid resin is an alkyd resin.

13. The composition of claim 11 in which said polycarboxylic acid resin is a reaction product of a drying oil fatty acid ester and at least one acidic compound selected from the group consisting of anhydrides of alpha, beta-ethylenically unsaturated dicarboxylic acids, alpha, beta-ethylenically unsaturated dicarboxylic acids which form anhydrides, fumaric acid, and mixtures thereof.

14. The composition of claim 13 in which said acidic compound is maleic anhydride.

15. An article comprising a surface having thereon a cured adherent film comprising a reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a polyfunctional hydroxyl-containing carboxylic acid.

16. An article comprising a surface having thereon a cured adherent film of a coating composition comprising the reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a dihydroxyaryl alkylidene carboxylic acid.

17. An article comprising a surface having thereon a cured adherent film of a coating composition comprising
   a. a reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a polyfunctional hydroxyl-containing carboxylic acid, and
   b. at least one other electrodepositable film-forming component.

18. An article comprising a surface having thereon a cured adherent film of a coating composition comprising
   a. a reaction product of an amine-aldehyde condensation product selected from the group consisting of a melamine-aldehyde condensation product, a formoguanamine-aldehyde condensation product, an acetoguanamine-aldehyde condensation product and a benzoguanamine-aldehyde condensation product and a polyfunctional hydroxyl-containing carboxylic acid, and
   b. a polycarboxylic acid resin.

19. The article of claim 18 in which said polycarboxylic acid resin is an alkyd resin.

20. The article of claim 18 in which said polycarboxylic acid resin is a reaction product of a drying oil fatty acid ester and at least one acidic compound selected from the group consisting of aldehydes of alpha, beta-ethylenically unsaturated dicarboxylic acids which form anhydrides, fumaric acid, and mixtures thereof.

21. A composition suitable for coating by electrophoresis consisting essentially of an ionized aqueous solution of
   a. a resin which is an alkylated amino resin at least partially transetherified by reaction with a hydroxycarboxylic acid or an alkyl ether of an amino resin precondensate at least partially transetherified by reaction with a hydroxycarboxylic acid,
   b. a water-soluble alkyd resin, and
   c. ammonia or an organic base.

22. A composition according to claim 21 wherein the pH of the aqueous solution is in the range 6.5 to 9.0.

23. A composition according to claim 21 wherein the amino resin is a urea-formaldehyde reaction product, a melamine-formaldehyde reaction product or a benzoguanamine-formaldehyde reaction product.

24. A composition according to claim 21 wherein the amino resin has been alkylated by reaction with an alcohol having 1 to 5 carbon atoms.

25. A composition according to claim 21 wherein the amino resin precondensate has been reacted with an alcohol having 1 to 5 carbon atoms.

26. A composition according to claim 21 wherein the alkyd resin is one based on dimethylol propionic acid or trimellitic acid.

27. A composition according to claim 21 wherein the alkyd resin is that made by condensing 1 mole of linseed oil with 3 mole maleic anhydride to an acid value of 190–200.

28. A composition according to claim 21 wherein the hydroxycarboxylic acid is dimethylol propionic acid, gallic acid, lactic acid or glycollic acid.

29. A composition according to claim 21 wherein the hydroxycarboxylic acid is that made by condensing a glycol and a dicarboxylic acid or anhydride.

30. A composition according to claim 21 wherein the organic base has a boiling point below 140°C.

31. A composition according to claim 30 wherein the organic base is dimethylamino ethanol or triethylamine.

32. A composition according to claim 21 wherein the ratio by weight of component (b) to component (a) is between 1:1 and 19:1.

33. A composition according to claim 32 wherein the ratio by weight of component (b) to component (a) is between 7:3 and 9:1.

34. An article coated electrophoretically by means of a composition according to claim 21.

35. A thermosetting reaction product of an aminotriazine/aldehyde condensate and an aliphatic hydroxyl group containing carboxylic acid.

36. The product as in claim 35 wherein the aminotriazine is a melamine.

37. The product as in claim 36 wherein the aldehyde is formaldehyde.

38. A thermosetting reaction product of a condensate of a melamine and an aldehyde and an aliphatic hydroxy group containing carboxylic acid.

39. A thermosetting reaction product of a condensate of a melamine and formaldehyde with an aliphatic hydroxy group containing carboxylic acid.

40. A thermosetting reaction product of an aminotriazine/aldehyde condensate and an aliphatic hydroxy-group containing carboxylic acid wherein the aminotriazine is selected from the group consisting of melamine, benzoguanamine, formoguanamine, acetoguanamine, and substituted melamines selected from 2,4,6-triethyltriamino-1,3,5-triazine and 2,4,6-triphenyltriamino-1,3,5-triazine; the aldehyde is selected from the group consisting of formaldehyde, acetaldehyde and benzaldehyde, the resulting alkylol may be etherified with an alcohol selected from the group consisting of alkanols of 1 to 12 carbon atoms and benzyl alcohol; and the hydroxy acid is selected from the group consisting of glycolic acid, beta-hydroxy propionic acid, alpha-hydroxy butyric acid and dimethylol propionic acid.

41. A thermosetting reaction product of an aminotriazine/aldehyde condensate and an aliphatic hydroxy-group containing carboxylic acid wherein the aminotriazine is selected from the group consisting of melamine and substituted melamines selected from 2,4,6-triethyltriamino-1,3,5-triazine and 2,4,6-triphenyltriamino-1,3,5-triazine; the aldehyde is selected from the group consisting of formaldehyde, acetaldehyde and benzaldehyde, the resulting alkylol may be etherified with an alcohol selected from the group consisting of alkanols of 1 to 12 carbon atoms and benzyl alcohol; and the hydroxy acid is elected from the group consisting of glycolic acid, beta-hydroxy propionic acid, alpha-hydroxy butyric acid and dimethylol propionic acid.

42. A thermosetting reaction product of an aminotriazine/aldehyde condensate and an aliphatic hydroxyl-group containing carboxylic acid wherein the aminotriazine is selected from the group consisting of melamine and substituted melamines selected from 2,4,6-triethyltriamino-1,3,5-triazine and 2,4,6-triphenyltriamino-1,3,5-triazine; the aldehyde is formaldehyde, the resulting alkylol may be etherified with an alcohol selected from the group consisting of alkanols of 1 to 12 carbon atoms and benzyl alcohol; and the hydroxy acid is selected from the group consisting of glycolic acid, beta-hydroxy propionic acid, alpha-hydroxy butyric acid and dimethylol propionic acid.

43. A thermosetting reaction product of hexakis (methoxymethyl) melamine and glycolic acid.

44. A thermosetting reaction product of hexakis (methoxymethyl) melamine and dimethylol propionic acid.

* * * * *